United States Patent
Lee

(10) Patent No.: US 10,380,264 B2
(45) Date of Patent: Aug. 13, 2019

(54) MACHINE TRANSLATION METHOD AND APPARATUS

(71) Applicant: Samsung Electronics Co., Ltd., Suwon-si (KR)

(72) Inventor: Hodong Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/429,709

(22) Filed: Feb. 10, 2017

(65) Prior Publication Data

US 2018/0052829 A1    Feb. 22, 2018

(30) Foreign Application Priority Data

Aug. 16, 2016 (KR) .................. 10-2016-0103574

(51) Int. Cl.
*G06F 17/27* (2006.01)
*G06F 17/28* (2006.01)

(52) U.S. Cl.
CPC ...... *G06F 17/2863* (2013.01); *G06F 17/2755* (2013.01); *G06F 17/2809* (2013.01)

(58) Field of Classification Search
CPC ............ G06F 17/2863; G06F 17/2809; G06F 17/2755
See application file for complete search history.

(56) References Cited

U.S. PATENT DOCUMENTS

| 6,594,382 | B1* | 7/2003 | Woodall | G06K 9/4609 382/156 |
| 7,831,433 | B1* | 11/2010 | Belvin | G10L 15/18 704/275 |
| 9,330,720 | B2* | 5/2016 | Lee | G11B 20/10527 |
| 9,519,858 | B2* | 12/2016 | Zweig | G06N 3/04 |
| 9,535,906 | B2* | 1/2017 | Lee | G06F 1/1626 |
| 9,875,235 | B1* | 1/2018 | Das | G06F 17/2705 |
| 10,108,612 | B2* | 10/2018 | Lee | G06F 1/1626 |
| 2004/0243390 | A1 | 12/2004 | Pinkham | |

(Continued)

FOREIGN PATENT DOCUMENTS

| JP | 2015-170043 A | 9/2015 |
| KR | 10-2012-0048104 A | 5/2012 |

(Continued)

OTHER PUBLICATIONS

Chae, B., "Naver translate, where is it up to?" retrieved on Nov. 25, 2015 from www.bloter.net, (4 pages in English; 6 pages in Korean).

(Continued)

*Primary Examiner* — Marcus T Riley
(74) *Attorney, Agent, or Firm* — NSIP Law

(57) ABSTRACT

A machine translation method and apparatus are provided. The machine translation apparatus generates a feature vector of a source sentence from the source sentence, where the source sentence being is written in a first language, and converts the generated feature vector of the source sentence to a feature vector of a normalized sentence. The machine translation apparatus generates a target sentence from the feature vector of the normalized sentence, wherein the target sentence corresponding corresponds to the source sentence and being is written in a second language.

20 Claims, 9 Drawing Sheets

(56) References Cited

U.S. PATENT DOCUMENTS

| | | | | |
|---|---|---|---|---|
| 2005/0054381 A1* | 3/2005 | Lee | ................... | G06F 3/011 455/557 |
| 2009/0319267 A1* | 12/2009 | Kurki-Suonio | ......... | G10L 15/30 704/235 |
| 2013/0262080 A1* | 10/2013 | Marciano | ............ | G06F 17/2836 704/3 |
| 2014/0229158 A1* | 8/2014 | Zweig | ...................... | G06N 3/04 704/9 |
| 2014/0244261 A1* | 8/2014 | Arisoy | ................... | G10L 15/18 704/257 |
| 2015/0339570 A1* | 11/2015 | Scheffler | ................. | G06N 3/10 706/16 |
| 2015/0340032 A1* | 11/2015 | Gruenstein | ............ | G10L 15/16 704/232 |
| 2016/0117316 A1* | 4/2016 | Le | ....................... | G06N 3/0445 704/9 |
| 2017/0372696 A1* | 12/2017 | Lee | ......................... | G10L 15/02 |
| 2018/0052829 A1* | 2/2018 | Lee | ..................... | G06F 17/2755 |

FOREIGN PATENT DOCUMENTS

| KR | 10-2013-0042822 A | 4/2013 |
|---|---|---|
| KR | 10-2013-0047471 A | 5/2013 |

OTHER PUBLICATIONS

Lee, K. et al., "English-Korean Transfer Based on Patterns and Examples," HanYang University, Dept. of Computer Science and Engineering, 1999 (4 pages).

"Workshop on Technologies and Corpora for Asia-Pacific Speech Translation (TCAST)," Asian Speech Translation Advanced Research Consortium (A-Star), Workshop Hosted by International Institute of Information Technology, India on Jan. 11, 2008 in Hyderabad, India (42 pages).

* cited by examiner

400

MACHINE TRANSLATION METHOD AND APPARATUS

CROSS-REFERENCE TO RELATED APPLICATION(S)

This application claims the benefit under 35 USC § 119(a) of Korean Patent Application No. 10-2016-0103574, filed on Aug. 16, 2016, in the Korean Intellectual Property Office, the entire disclosure of which is incorporated herein by reference for all purposes.

BACKGROUND

1. Field

The following description relates to a machine translation method and apparatus.

2. Description of Related Art

The Internet and information telecommunication (IT) technologies have been further developing to provide users information content in various languages. Also, with globalization in business and other transactions, interpretation and translation technologies for a content translation, and communication between users who speak various languages are rapidly developing.

However, each language is full of idioms and phraseology that, as the language changes with everyday use, changes by region, class and cultural background, a very different or incorrect interpretation and translation results may be obtained. A machine translation method and apparatus are desired that are able to provide accurate language translation, while considering idioms and phraseology of a particular language.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with a general aspect, there is provided a machine translation method, including: generating, at a processor, a feature vector of a source sentence, wherein the source sentence may be written in a first language; converting, at the processor, the feature vector of the source sentence to a feature vector of a normalized sentence; and generating, at the processor, a target sentence from the feature vector of the normalized sentence, wherein the target sentence corresponds to the source sentence and may be written in a second language.

The feature vector of the normalized sentence may be a closest feature vector to the generated feature vector of the source sentence, among pre-determined feature vectors of normalized sentences.

The normalized sentence may include any one or any combination of any two or more of a vocabulary, a morpheme, or a symbol omitted from the source sentence.

The normalized sentence may be a sentence generated by a substitution of any one or any combination of two or more of a morpheme, a vocabulary, a word, or a phrase included in the source sentence.

The normalized sentence may be a sentence generated by changing word spacing in the source sentence.

The normalized sentence may be a sentence generated by changing a word order in the source sentence.

The source sentence may be a sentence generated by recognizing a voice signal in the first language received from a user.

In accordance with another general aspect, there is provided a machine translation method, including: generating, at a processor, a feature vector of a source sentence, wherein the source sentence may be written in a first language; converting, at the processor, the feature vector of the source sentence to a feature vector of a target sentence, wherein the target sentence may be written in a second language; and generating, at the processor, a normalized sentence from the feature vector of the target sentence by transforming the target sentence.

The generating of the normalized sentence may include: selecting a closest feature vector to the feature vector of the target sentence from feature vectors of pre-determined normalized sentences; and generating the normalized sentence from the selected feature vector.

The normalized sentence may be a sentence generated by any one or any combination of two or more of omitting a vocabulary, a morpheme and a symbol from the target sentence, substituting a vocabulary and a morpheme in the target sentence, or changing word spacing and a word order in the target sentence.

In accordance with a general aspect, there is provided a non-transitory computer-readable storage medium storing instructions that, when executed by a processor, cause the processor to perform the method described above.

In accordance with a general aspect, there is provided a machine translation apparatus, including: a memory including a neural network; and a processor configured to generate a feature vector of a source sentence, convert the generated feature vector of the source sentence to a feature vector of a normalized sentence, and generate a target sentence from the feature vector of the normalized sentence, based on the neural network, wherein the source sentence may be written in a first language, and the target sentence corresponding to the source sentence may be written in a second language.

The feature vector of the normalized sentence may be a closest feature vector to the generated feature vector of the source sentence among feature vectors of pre-determined normalized sentences.

The normalized sentence may be a sentence generated by a substitution of any one or any combination of any two or more of a morpheme, a vocabulary, a word, or a phrase included in the source sentence.

The normalized sentence may be a sentence generated by changing word spacing in the source sentence.

The normalized sentence may be a sentence generated by changing a word order in the source sentence.

The source sentence may be a sentence generated by recognizing a voice signal in the first language received from a user.

In accordance with a general aspect, there is provided a machine translation method, including: encoding, at a processor, a source sentence written in a first language; generating, at the processor, a feature vector of the source sentence, wherein the feature vector of the source sentence corresponds to sentence information of the source sentence; selecting, at the processor, a feature vector of a normalized sentence from feature vectors of normalized sentences by processing the feature vector of the source sentence, wherein the normalized sentence may be generated based on any one or any combination of any two or more of a word order, word spacing, an omission of a symbol, a morpheme and a vocabulary of the source sentence, and a substitution of morpheme and vocabulary of the source sentence; compressing, at the processor, the feature vector of the normalized sentence to an embedding vector with a smaller dimension than a dimension of the feature vector of the normalized sentence; and decoding, at the processor, the embedding vector of the normalized sentence to generate a target sentence written in a second language.

The normalized sentence may be a sentence generated by a substitution of at least one of the morpheme, the vocabulary, a word or a phrase included in the source sentence.

The machine translation method may also include: transforming the normalized sentence based on a transformation rule, wherein the transformation rule may be a rule for the word order, the word spacing, the omission of a symbol, the morpheme and the vocabulary, and the substitution of morpheme and the vocabulary.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
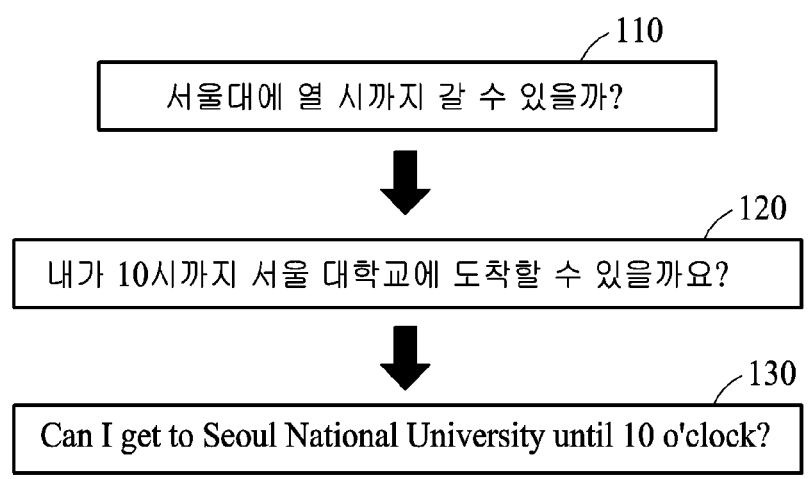
FIG. 1 illustrates an example of a process to perform a machine translation by transforming a source sentence to a normalized sentence.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following specific structural or functional descriptions are exemplary to merely describe the examples, and the scope of the examples is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

In the following description, various examples are included to provide language interpretation or translation. Examples may be implemented as various products, for example, personal computers (PC), laptop computers, tablet computers, smartphones, wearable devices, smart home appliances or intelligent vehicles. For example, examples may be applicable to provide language interpretation or translation in a smartphone, a mobile device or a wearable device. Hereinafter, examples will be described in detail with reference to the accompanying drawings, and like reference numerals refer to like elements throughout.

FIG. 1 illustrates an example of a process to perform a machine translation by transforming a source sentence to a normalized sentence.

FIG. 1 illustrates an input source sentence 110, a normalized sentence 120 and a target sentence 130. The source sentence 110 and the normalized sentence 120 are written in a first language, and the target sentence 130 is written in a second language.

A machine translation apparatus receives an input from a user the source sentence 110 desired by the user to be translated. The source sentence 110 is written in a first language. Prior to translating the source sentence 110 into the target sentence 130, the machine translation apparatus transforms the source sentence 110 to the normalized sentence 120, which is written in the second language.

The source sentence 110 is a sentence written in the first language to be translated. The source sentence 110 is a sentence input by a user.

Various types of source sentences in the first language may have the same or similar meanings. Based on such various types of sentences, an accuracy of a translation operation of the sentences into the target sentence 130 written in the second language may change. When a single sentence, such as the source sentence 110, is input to the machine translation apparatus, the machine translation apparatus transforms the input sentence to the normalized sentence 120.

The normalized sentence 120 is a sentence into which the source sentence 110 is transformed. The normalized sentence 120 is a sentence generated by transforming the source sentence 110, which is based on a predetermined expression form or is based on a particular context in the first language. For example, the normalized sentence 120 is generated by transforming the source sentence 110 in the expression form based on grammar of the first language, without distorting a meaning of the source sentence 110. The expression form is determined based on the grammar of the first language, and the normalized sentence 120 is transformed, for example, as a representative sentence that is most commonly used by people who speak the first language. The normalized sentence 120 includes "내가 10시까지 서울 대학교에 도착할 수 있을까요 ?" as shown in FIG. 1. In addition to grammar, other factors may be used to generate the normalized sentence 120, which include semantics, context of use of a word, such as a noun or a verb with respect to other words in the source sentence 10, taxonomy mnemonics, morphological structure, and/or statistical methods such as the Bayesian probability theory. Taxonomy mnemonics are used to memorize the scientific classification applied in taxonomy. They are usually constructed with a series of words that begin with the letters KPCOFGS, corresponding to the initials of the primary taxonomic ranks. Words beginning with D (corresponding to domain) are sometimes added to the beginning of the sequence of words, and words beginning with S (corresponding to subspecies) are sometimes added at the end of the sequence of words. Bayesian probability theory is an interpretation of the concept of probability, in which, instead of frequency or propensity of some phenomenon, assigned probabilities represent states of knowledge.

Also, the machine translation apparatus translates the normalized sentence 120 into the target sentence 130.

The target sentence 130 is a sentence written in the second language and represents a translation result of the source sentence 110. The target sentence 130 expresses the source sentence 110 in the second language. For example, the target sentence 130 includes "Can I get to Seoul National University until 10 o'clock?" as shown in FIG. 1.

Processes of transforming the source sentence 110 to the normalized sentence 120 and translating the normalized sentence 120 into the target sentence 130 are performed based on a neural network included in the machine translation structural apparatus. An example of a machine translation based on the neural network will be described with reference to FIGS. 3, 4, and 5 below.

Figure 2:
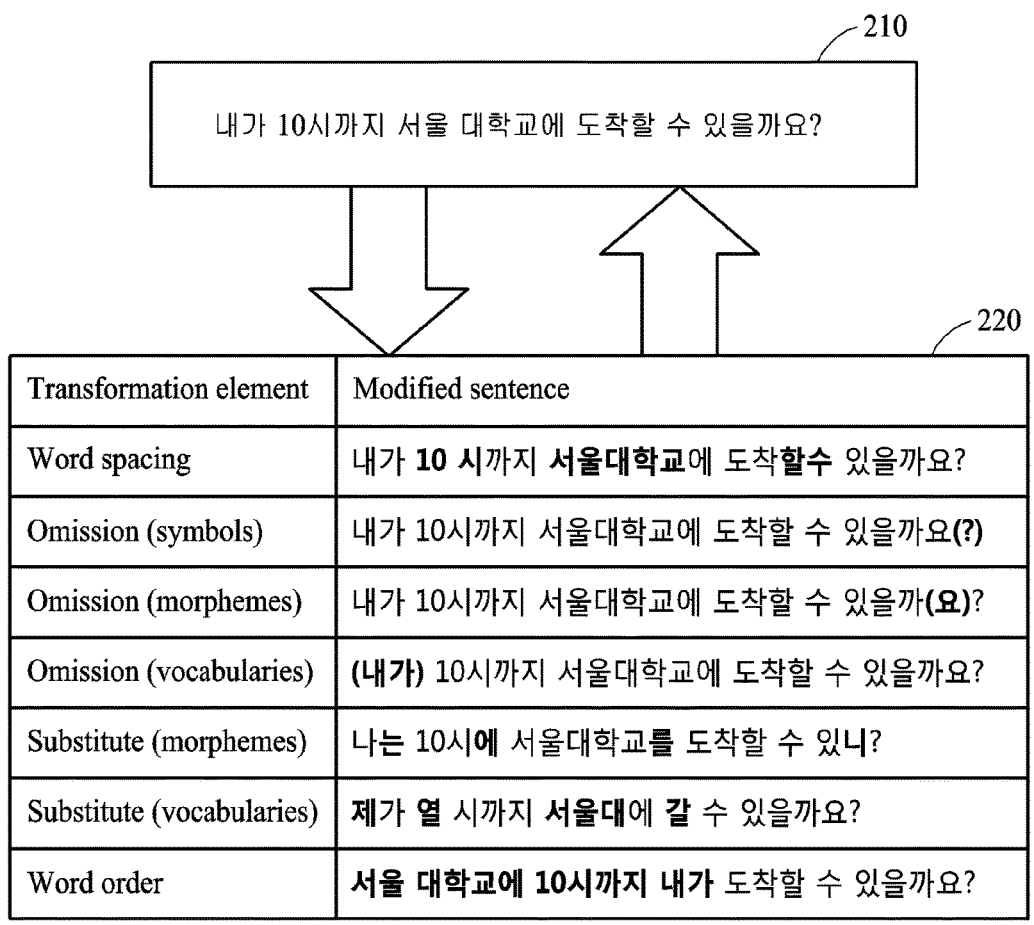
FIG. 2 illustrates an example of a normalized sentence and modified sentences.

FIG. 2 illustrates an example of a normalized sentence and modified sentences.

FIG. 2 illustrates a normalized sentence 210 written in a first language, and various modified sentences 220 associated with the normalized sentence 210.

In FIG. 2, the normalized sentence 210 includes "내가 10시까지 서울 대학교에 도착할 수 있을까요 ?." The normalized sentence 210 is a sentence generated by transforming the source sentence 110 corresponding to a modified sentence in a predetermined form of the first language. The normalized sentence 210 is a sentence generated by transforming the source sentence 110 in the form based on, any one or any combination of any two or more of grammar, semantics, context of use of a word, taxonomy mnemonics, morphological structure, and statistical methods.

The modified sentences 220 include, for example, a sentence generated by transforming the normalized sentence 210 based on a transformation rule. The transformation rule is a rule for a transformation element, for example, a word order, word spacing, an omission of symbols, morphemes and vocabularies, and a substitution of morphemes and vocabularies.

In an example, the transformation rule includes a transformation rule for word spacing. Word spacing in a normalized sentence is transformed without distorting a meaning of the normalized sentence. The transformation rule for word spacing is associated with word spacing that is often incorrectly used, and includes, for example, a word spacing rule for an expression of numbers, dependent nouns, auxiliary verbs or compound nouns. A meaning of a sentence is distorted when word spacing is incorrectly applied in the sentence, and thus a rule for word spacing is determined so that the word spacing is represented together with parallel representation or error representation.

In FIG. 2, a modified sentence 220 in which the word spacing is transformed includes "내가 10시까지 서울 대학교에 도착할 수 있을까요 ?."

In another example, the transformation rule includes a transformation rule for symbol omission. In some instances, meaning of a sentence becomes unclear due to symbols included in the sentence. However, generally, a problem does not occur to convey, construe, or translate the correct meaning of the source sentence 130 even though a symbol is absent when transforming the source sentence 130 into the normalized sentence 130 or 210. Based on the above characteristic, the transformation rule for symbol omission is determined.

In FIG. 2, a modified sentence 220 generated by omitting a symbol includes "내가 10시까지 서울 대학교에 도착할 수 있을까요 (?)." Parentheses in the modified sentences 220 illustrated in FIG. 2 indicate omission.

In still another example, the transformation rule includes a transformation rule for morpheme omission. A morpheme is the smallest grammatical unit in a language. A morpheme is not identical to a word, and the principal difference between the two is that a morpheme may or may not stand alone, whereas a word, by definition, is freestanding. By determining postpositions or endings through a morpheme analysis, a portion of morphemes included in a sentence is omitted without distorting a meaning of the sentence. Based on the above characteristic, the transformation rule for morpheme omission is determined.

In FIG. 2, a modified sentence 220 generated by omitting morphemes includes "내가 10시까지 서울 대학교에 도착할 수 있을까요 ?."

In yet another example, the transformation rule includes a transformation rule for vocabulary omission. In some instances, a meaning of a sentence is not distorted even though a portion of vocabularies is omitted from the sentence. For example, despite omission of a vocabulary that is sufficiently recognized among people having a conversation or between a writer and a reader, a meaning of a sentence or the conversation is not distorted. The sufficiently recognized vocabulary includes, for example, "I" as a first-person subject. Based on the above characteristic, the transformation rule for vocabulary omission is determined.

In FIG. 2, a modified sentence 220 generated by omitting a vocabulary includes "내가 10시까지 서울 대학교에 도착할 수 있을까요 ?."

In a further example, the transformation rule includes a transformation rule for morpheme substitution. By determining postpositions or endings through a morpheme analysis, one of morphemes included in a sentence is substituted with another morpheme without distorting a meaning of the sentence. Based on the above characteristic, the transformation rule for morpheme substitution is determined.

In FIG. 2, a modified sentence 220 generated by substituting morphemes includes "나는 10시에 서울 대학교를 도착할 수 있니?."

In a further example, the transformation rule includes a transformation rule for vocabulary substitution. Vocabulary substitution is performed using synonyms. In an example, substitution of an uninflected word, a predicate, or a modifier in a morpheme analysis is performed based on an ontology or synonym dictionary. In another example, substitution of numbers is performed based on various number representations, or a vocabulary expression of a combination of numbers and measure nouns. In still another example, substitution of places' or people's names or name of things is performed by analyzing variously used or known names based on a name dictionary. In yet another example, substitution between similar words or phrases is performed based on a phrase dictionary. Based on the above characteristic, the transformation rule for vocabulary substitution is determined.

In FIG. 2, a modified sentence 220 generated by substituting vocabularies includes "내가 열 시까지 서울대에 갈 수 있을까요?."

In a further example, the transformation rule includes a transformation rule for a word order based on a sentence structure. The sentence structure is analyzed based on sentence parsing including part-of-speech tagging, and thus a word order of a sentence is changed, based on a language of the source sentence 110 and a language of the target sentence 130, without distorting a meaning of the sentence. Various modified sentences are generated by changing an order of a subject, an object, and an adverb.

For example, words in a sentence, "동생이 옷을 빠르게 입었다", are rearranged in different word orders shown below.

"옷을 빠르게 동생이 입었다"
"빠르게 옷을 동생이 입었다"
"옷을 동생이 빠르게 입었다"
"빠르게 동생이 옷을 입었다."
"동생이 빠르게 옷을 입었다."

Various transformation rules are applied to the word orders and are expressed as shown below.

"S->NP_subj NP_obj VP"
"S->N_obj NP_subj VP"
"S->ADVP NP_subj NP_obj VP"
"S->N_obj ADVP NP_subj VP"
"S->N_obj NP_subj ADVP VP"

In the various transformation rules, S denotes a sentence, NP_subj denotes a subject, NP_obj and N_obj denote objects, VP denotes a verb and ADVP denotes an adverb.

An adjustment of a word order based on a syntactic relationship is determined as a transformation rule depending on grammatical rules of a particular source language and a target language. For example, in a complex sentence including a subordinate clause or juxtaposed clauses, a meaning of a phrase included in each sentence is distorted when the phrase is outside a corresponding sentence. Thus, based on the above characteristic, the transformation rule for a word order is determined.

In FIG. 2, a modified sentence 220 generated by changing a word order includes "서울 대학교에 10시까지 내가 도착할 수 있을까요?."

Based on the above-described transformation rules, various modified sentences 220 are generated from the normalized sentence 210. The modified sentences 220 are generated based on a transformation rule associated with a syntactic structure, for example, word spacing, a symbol, a morpheme or a word order, a transformation rule associated with a substitute, for example, a synonym, a name or a number, and a transformation rule associated with similar phrases or clauses.

A modified sentence 220 is generated from the normalized sentence 210 based on a neural network. For example, a modified sentence 220 is generated based on an autoencoder neural network, an encoder-decoder neural network, and a deep learning neural network.

The neural network is trained to generate various modified sentences 220 from the normalized sentence 210. The training of the neural network is based on a determination of a weight or a parameter of the neural network.

The neural network used to generate a modified sentence is trained based on, for example, a random function so that the same modified sentence is not generated based on the neural network. Also, the neural network is trained so that the same modified sentence as the normalized sentence 210 is not finally output. Candidate sentences that are similar to the normalized sentence 210 are selected from sentences generated by the neural network, based on a bilingual evaluation understudy (BLEU) score, a distance based on a cosine distance of an embedding vector, and a vector similarity function for purposes. As a result, various modified sentences 220 are generated from the normalized sentence 210.

Figure 3:
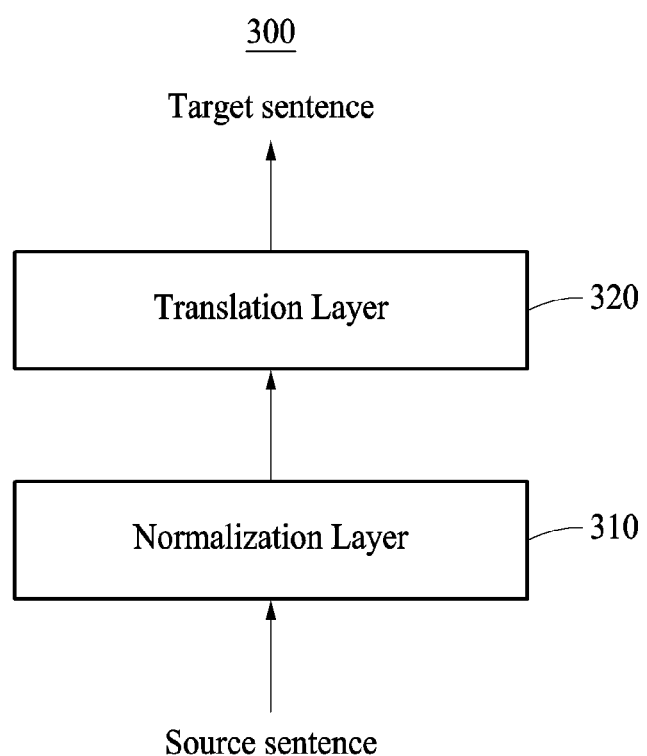
FIG. 3 illustrates an example of a neural network for a machine translation.

FIG. 3 illustrates an example of a neural network for a machine translation.

FIG. 3 illustrates a neural network 300 for a machine translation. The neural network 300 translates an input source sentence into a target sentence by processing a feature vector extracted from the input source sentence. The source sentence and the target sentence are written in a first language and a second language, respectively.

The neural network 300 of FIG. 3 includes a normalization layer 310 and a translation layer 320. For convenience of description, each of the normalization layer 310 and the translation layer 320 is ideally represented as at least one layer included in the neural network 300. However, in an alternative example, the normalization layer 310 and the translation layer 320 can be combined in a single layer to be processed in the neural network 300.

The normalization layer 310 transforms the source sentence to a normalized sentence. For example, the normalization layer 310 generates a feature vector of the source sentence and converts the feature vector of the source sentence to a feature vector of the normalized sentence.

As previously explained, the normalized sentence is a sentence generated by transforming the source sentence corresponding to the modified sentence in a predetermined form of the first language. The normalized sentence is a sentence generated by transforming the source sentence in the form based on, at least, grammar of the first language without distorting a meaning of the source sentence.

The normalized sentence is, for example, a sentence generated by any one or any combination of any two or more of a vocabulary, a morpheme and a symbol from the source sentence, substituting a vocabulary and a morpheme in the source sentence, or changing word spacing and a word order in the source sentence. In an example, the normalized sentence is a sentence generated by transforming the source sentence to include any one or any combination of any two or more of a vocabulary, a morpheme or a symbol omitted from the source sentence without distorting the meaning of the source sentence. In another example, the normalized sentence is generated by transforming the source sentence through substitution of any one or any combination of any two or more of a morpheme, a vocabulary, a word or a phrase included in the source sentence without distorting the meaning of the source sentence. In still another example, the normalized sentence is a sentence generated by changing word spacing in the source sentence, without distorting the meaning of the source sentence. In a further example, the normalized sentence is a sentence generated by changing a word order in the source sentence, without distorting the meaning of the source sentence.

The normalized sentence and a source sentence, corresponding to a modified sentence from the normalized sentence, have different forms in a surface structure despite the same meanings. As a result, the feature vector of the source sentence and the feature vector of the normalized sentence are located adjacent to each other in a vector space. The normalization layer 310 moves the feature vector of the source sentence to the feature vector of the normalized sentence. The feature vector of the normalized sentence is located adjacent to the feature vector of the source sentence in the vector space.

The normalized sentences are determined in advance and, accordingly, feature vectors of the plurality of normalized sentences are also determined in advance. The feature vectors of the plurality of normalized sentences are located in an n-dimensional vector space, and n is a natural number.

In the normalization layer 310, a closest feature vector to the feature vector of the source sentence is selected from the feature vectors of the normalized sentences, and the feature vector of the source sentence is converted to the selected feature vector.

The translation layer 320 translates the normalized sentence written in the first language into the target sentence in the second language. For example, the translation layer 320 generates the target sentence from the feature vector of the normalized sentence. The translation layer 320 generates the target sentence from the normalized sentence instead of from the source sentence. Thus, a translation result robust against a modified sentence may be generated.

Figure 4:
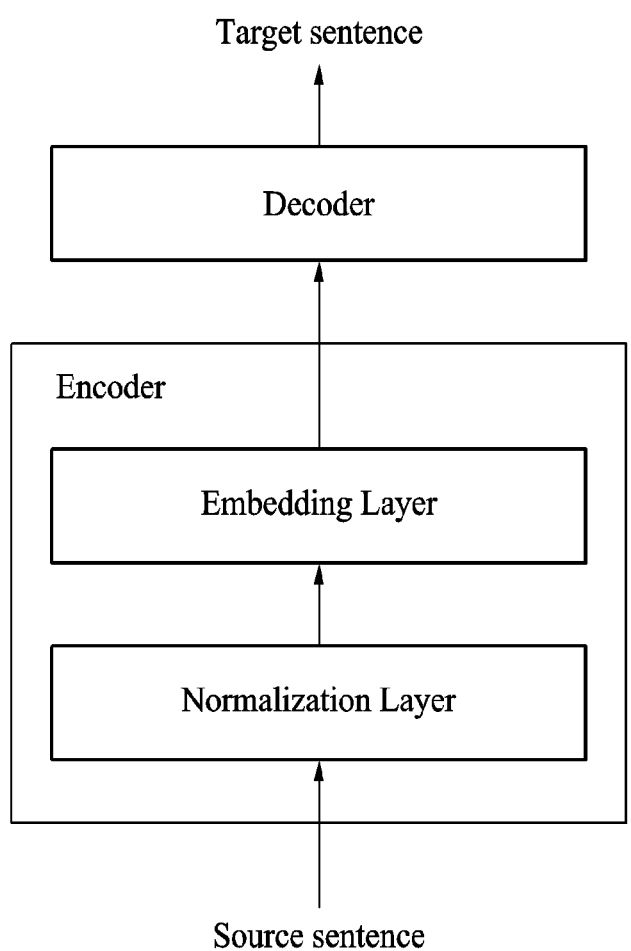
FIGS. 4 and 5 illustrate examples of a neural network including an encoder and a decoder for a machine translation.
Figure 5:
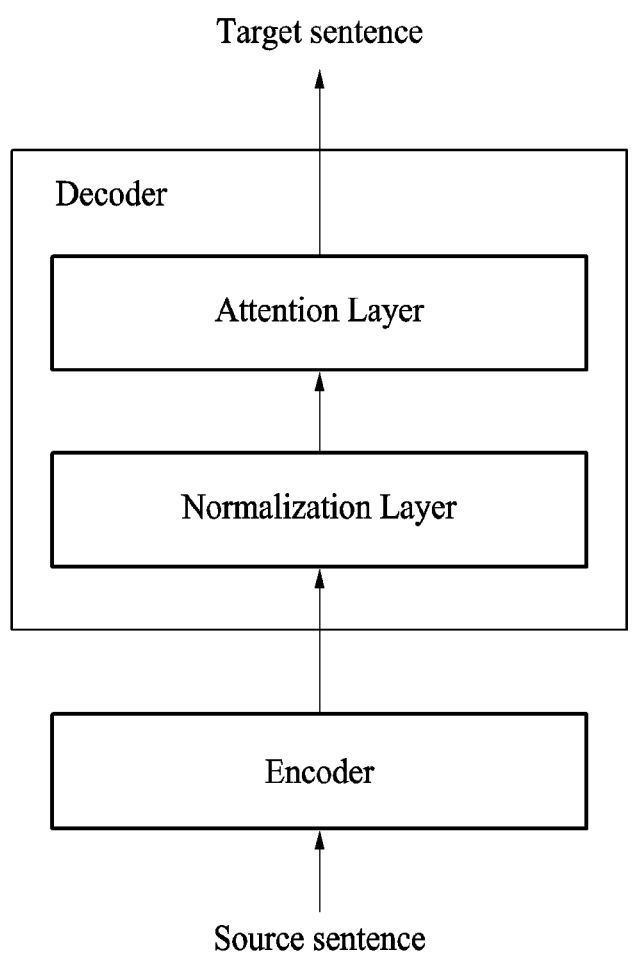

FIGS. 4 and 5 illustrate examples of a neural network including an encoder and a decoder for a machine translation.

Referring to FIG. 4, a neural network 400 includes an encoder and a decoder. The encoder includes a normalization layer and an embedding layer.

The encoder encodes a source sentence written in a first language and generates a feature vector of the source sentence. The feature vector of the source sentence corresponds to abstracted sentence information associated with the source sentence.

The normalization layer included in the encoder generates a feature vector of a normalized sentence by processing the feature vector of the source sentence. The embedding layer included in the encoder compresses the feature vector of the normalized sentence to an embedding vector with a smaller dimension than a dimension of the feature vector of the normalized sentence.

The decoder decodes the embedding vector of the normalized sentence and generates a target sentence written in a second language. The decoder translates the normalized sentence written in the first language into the target sentence written in the second language.

When a normalization process of the source sentence in the first language needs to be performed prior to a translation, the normalization layer is included in the encoder of the neural network 400 as shown in FIG. 4.

Referring to FIG. 5, a neural network 500 includes an encoder and a decoder. The decoder includes a normalization layer.

The encoder encodes a source sentence written in a first language and generates a feature vector of the source sentence. The feature vector of the source sentence corresponds to abstracted sentence information associated with the source sentence. The encoder in FIG. 5 may correspond to the encoder illustrated and described with respect to FIG. 4.

The decoder decodes the feature vector of the source sentence and generates a target sentence written in a second language. A normalization layer included in the decoder converts the target sentence to a normalized sentence. For example, the normalization layer in the decoder converts a feature vector of the target sentence to a feature vector of the normalized sentence, and the decoder outputs a final target sentence based on the feature vector of the normalized sentence.

The normalized sentence is a sentence generated by transforming the target sentence, and includes, for example, a sentence generated by transforming the target sentence to a predetermined form of the second language. The normalized sentence is a sentence generated by transforming the target sentence to the predetermined form based on, for example, grammar of the second language without distorting a meaning of the target sentence. The form is determined based on the grammar of the second language, and the normalized sentence includes, for example, a representative sentence that is most commonly used by people who speak the second language.

The decoder further includes an attention layer. The attention layer uses a larger amount of information to perform a translation using an attention mechanism. For example, the attention layer allows vocabularies in the target sentence to be mapped by a one-to-many relationship or a many-to-one relationship, by training a portion of the source sentence that transmits information during generating of the target sentence. When a translation is performed, the attention layer uses additional information and feature information output from the encoder of the neural network 500. The additional information is, for example, information output from the encoder of the neural network 500, while the feature vector is generated from the source sentence. Thus, a portion of an encoder sequence to which the decoder of the neural network 500 pays attention is precisely determined during the translation. In an example, a connection structure for the attention mechanism is implemented as a separate neural network.

Figure 6:
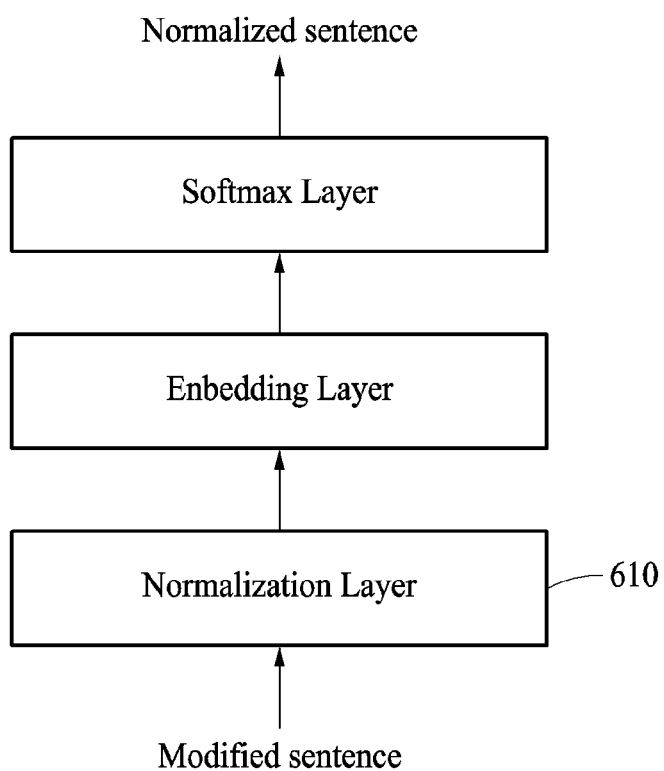
FIGS. 6, 7 and 8 illustrate examples of a process of training a normalization layer.
Figure 7:
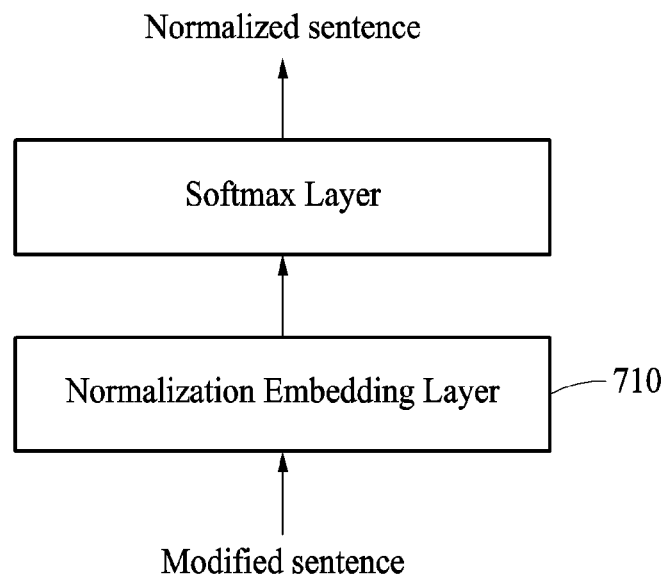

FIGS. 6 and 7 illustrate examples of a process of training a normalization layer.

FIG. 6 illustrates an example of training a normalization layer 610.

Training data used to train the normalization layer 610 includes various modified sentences and a normalized sentence. The normalization layer 610 is pre-trained based on the training data. The training data corresponds to a monolingual corpus including language data of the same language. The normalization layer 610 is trained based on the monolingual corpus including a modified sentence and a normalized sentence.

The normalization layer 610 is trained to output a normalized sentence in response to receiving a modified sentence as an input. The modified sentence includes, for example, a sentence generated by transforming the normalized sentence based on a transformation rule for a transformation element, for example, a word order, word spacing, an omission of symbols, morphemes and vocabularies, and a substitution of morphemes and vocabularies.

The normalized sentence is a sentence generated by transforming the modified sentence in a predetermined form based on, for example, grammar of a first language without distorting a meaning of the modified sentence. The normalized sentence includes, for example, a representative sentence that is most commonly used by people who speak the first language.

In an example, the normalized sentence is set as a sentence of a predetermined style. In another example, the normalized sentence is set as a sentence in a form previously defined by a user as a preferred form. The normalization layer 610 is trained based on the normalized sentence set as described above, and thus a translation result is generated as a personalized form.

The training of the normalization layer 610 is a determination of a weight or a parameter of a neural network including the normalization layer 610. The trained normalization layer 610 is inserted as a normalization layer in the neural networks of FIGS. 4 and 5, to transform a source sentence or a target sentence to a normalized sentence.

FIG. 7 illustrates an example of training a normalization embedding layer 710.

The normalization embedding layer 710 is generated by merging an embedding layer and the normalization layer 610 of FIG. 6. The description of FIG. 6 is also applicable to the normalization embedding layer 710, and accordingly is incorporated herein.

Training of the normalization embedding layer 710 is a determination of a weight or a parameter of a neural network including the normalization embedding layer 710. The trained normalization embedding layer 710 is inserted as a normalization layer in the neural networks of FIGS. 4 and 5, to transform a source sentence or a target sentence to a normalized sentence.

Figure 8:
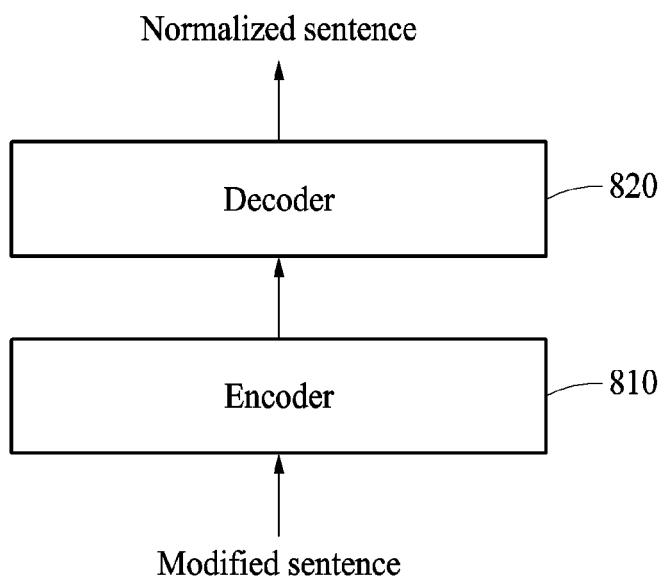

FIG. 8 illustrates an example of training an encoder 810 and a decoder 820.

In an example, a normalization layer is included in the encoder 810 as described above with reference to FIG. 4, or included in the decoder 820 as described above with reference to FIG. 5. In another example, the normalization layer is included in each of the encoder 810 and the decoder 820.

The encoder 810 and the decoder 820 are trained so that a normalized sentence is output from the decoder 820 in response to a modified sentence being input to the encoder 810. When the encoder 810 and the decoder 820 are trained, a normalization layer included in either one or both of the encoder 810 or the decoder 820 is also trained. The description of FIG. 6 is also applicable to a training process, and accordingly is not repeated here.

The training of the encoder 810 and the decoder 820 is understood as determining of a weight or a parameter of a neural network including the encoder 810 and the decoder 820. The trained encoder 810 is inserted as an encoder in the neural networks of FIGS. 4 and 5, and the trained decoder 820 is inserted as a decoder in the neural networks of FIGS. 4 and 5.

Figure 9:
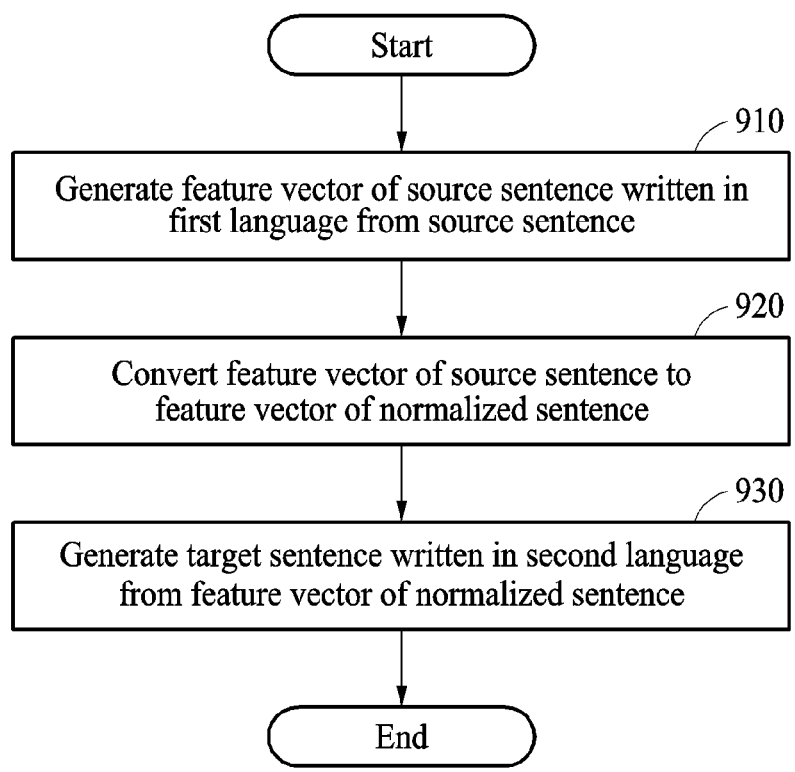
FIG. 9 illustrates an example of a machine translation method.

FIG. 9 illustrates an example of a machine translation method.

The machine translation method of FIG. 9 is performed by a processor included in a machine translation apparatus.

Referring to FIG. 9, in operation 910, the machine translation apparatus generates a feature vector of a source sentence from the source sentence. The source sentence is written in the first language. When a machine translation is performed by the machine translation apparatus based on a neural network including an encoder and a decoder, the machine translation apparatus encodes the source sentence and generates the feature vector of the source sentence.

In operation 920, the machine translation apparatus converts the feature vector of the source sentence to a feature vector of a normalized sentence. Normalized sentences are determined in advance. As a result, feature vectors of the normalized sentences are also determined in advance. The feature vectors of the normalized sentences are located in an n-dimensional vector space, where n is a natural number.

The feature vector of the normalized sentence obtained in operation 920 is a closest feature vector to the feature vector of the source sentence among the feature vectors of the normalized sentences. The closest feature vector indicates a feature vector with a shortest distance to another feature vector in the n-dimensional vector space.

The normalized sentence is a sentence generated by transforming the source sentence in a predetermined form of the first language. The normalized sentence is a sentence generated by transforming the source sentence based on, for example, grammar of the first language, without distorting a meaning of the source sentence. The normalized sentence is, for example, a sentence generated by any one or any combination of any two or more of omitting a vocabulary, a morpheme and a symbol from the source sentence, substituting a vocabulary and a morpheme in the source sentence, or changing word spacing and a word order in the source sentence.

In operation 930, the machine translation apparatus generates a target sentence from the feature vector of the normalized sentence. The target sentence is written in a second language and corresponds to the source sentence. When a machine translation is performed by the machine translation apparatus based on a neural network including an encoder and a decoder, the machine translation apparatus decodes the feature vector of the normalized sentence and generates the target sentence.

Although not shown in the drawings, another example of the machine translation method performed by the machine translation apparatus includes generating a feature vector of a source sentence written in a first language from the source sentence, converting the feature vector of the source sentence to a feature vector of a target sentence that corresponds to the source sentence and that is written in a second language, and generating a normalized sentence from the feature vector of the target sentence.

The description of FIGS. 1 through 8 is also applicable to the machine translation method of FIG. 9, and accordingly a description thereof is incorporated herein.

Figure 10:
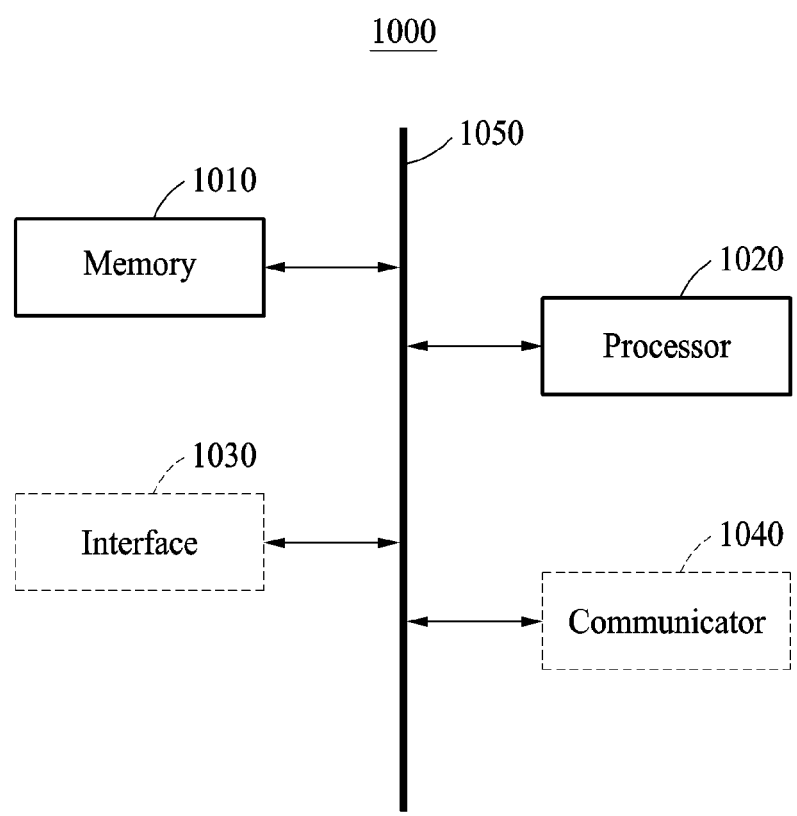
FIG. 10 illustrates an example of a machine translation apparatus.

FIG. 10 illustrates an example of a machine translation apparatus 1000.

Referring to FIG. 10, the machine translation apparatus 1000 includes a memory 1010 and a processor 1020. The machine translation apparatus 1000 further includes an interface 1030 and a communicator 1040. The memory 1010, the processor 1020, the interface 1030 and the communicator 1040 exchange data with each other via a bus 1050.

The memory 1010 includes, for example, a volatile memory and a nonvolatile memory, and stores information received via the bus 1050. The memory 1010 stores a neural network for a machine translation. Each of neural networks is stored as an executable object file or an execution file in the memory 1010. Also, parameters for each of the neural networks are stored in the memory 1010.

The processor 1020 extracts neural networks from the memory 1010 and applies parameters corresponding to each of the neural networks to implement a neural network for a machine translation.

In an example, the processor 1020 generates a feature vector of a source sentence, converts the feature vector of the source sentence to a feature vector of a normalized sentence, and generates a target sentence from the feature vector of the normalized sentence. The source sentence is written in a first language, and the target sentence is written in a second language and corresponds to a source sentence.

In another example, the processor 1020 generates a feature vector of a source sentence from the source sentence, converts the feature vector of the source sentence to a feature vector of a target sentence and generates a normalized sentence from the feature vector of the target sentence. The source sentence is written in a first language, and the target sentence is written in a second language and corresponds to a source sentence.

The machine translation apparatus 1000 receives through the interface 1030, as an input, a source sentence written in a first language from a user. In an example, the interface 1030 is a device configured to receive an input of a sentence written in the first language from a user, and includes a keypad included in the machine translation apparatus 1000 or a virtual keypad displayed on a display of the machine translation apparatus 1000.

In another example, the interface 1030 includes a microphone configured to receive a voice signal pronounced by a user. The voice signal received by the microphone is in the first language, is recognized as a source sentence in the first language using a voice recognition scheme, and the source sentence in the first language is translated into a target sentence in the second language through a machine translation using the above-described methods. The target sentence may be delivered to the user in writing or auditory through an output device, such as a speaker.

The machine translation apparatus 1000 receives a source sentence written in the first language from an external device via the communicator 1040. The machine translation apparatus 1000 translates the source sentence into a target sentence written in the second language, through a machine translation, and transfers a machine translation result to the external device via the communicator 1040.

Also, the machine translation apparatus 1000 receives a voice signal from a user of the external device via the communicator 1040. The machine translation apparatus 1000 recognizes a source sentence written in the first language from the voice signal, and transfers a machine translation result obtained by translating the source sentence into a target sentence, written in the second language, using the above-described methods to the external device via the communicator 1040.

The machine translation apparatus 1000 performs at least one method described above with reference to FIGS. 1 through 9.

According to examples, the various configurations described above of the machine translation apparatus and methods enhance an accuracy of a machine translation of various modified sentences based on a normalized sentence.

Also, according to the examples, a translation may be performed when a source sentence is transformed to a normalized sentence, making it possible to perform a machine translation robust against a semi-free word order language in which a relatively free word order is set and in which endings and postpositions are frequently utilized.

Furthermore, according to the examples, a normalization layer may be trained by setting a normalized sentence in a predetermined style or a form preferred by a user, making it possible to generate a machine translation sentence in a personalized form.

The apparatuses, units, modules, devices, and other components illustrated in FIGS. 3, 4, 5, 6, 7, 8 and 10 that perform the operations described herein with respect to FIG. 9 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIG. 9. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The method illustrated in FIG. 9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storages, optical data storages, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of performing machine translation, the method comprising:
   receiving, at an interface device, a source sentence written in a first language;
   generating, by a neural network and at a processor, a feature vector of the source sentence by inputting the source sentence to input layers of the neural network;
   converting, at the processor and using the neural network, the feature vector of the source sentence to a feature vector of a normalized sentence, the normalized sentence being generated from omitting any one or any combination of any two or more of a vocabulary, a morpheme, or a symbol from the source sentence without replacing the vocabulary, the morpheme, or the symbol;
   generating, at the processor and using the neural network, a target sentence from the feature vector of the normalized sentence, wherein the target sentence corresponds to the source sentence and is written in a second language; and
   providing, at the processor, a result of the generating of the target sentence from output layers of the neural network.

2. The machine translation method of claim 1, wherein the feature vector of the normalized sentence is a closest feature vector to the generated feature vector of the source sentence, among pre-determined feature vectors of normalized sentences.

3. The machine translation method of claim 1, wherein the normalized sentence is a sentence generated by a substitution of any one or any combination of two or more of a morpheme, a vocabulary, a word, or a phrase included in the source sentence.

4. The machine translation method of claim 1, wherein the normalized sentence is a sentence generated by changing word spacing in the source sentence.

5. The machine translation method of claim 1, wherein the normalized sentence is a sentence generated by changing a word order in the source sentence.

6. The machine translation method of claim 1, wherein the source sentence is a sentence generated by recognizing a voice signal in the first language received from a user.

7. A processor-implemented method of performing machine translation, the method comprising:
   receiving, at an interface device, a source sentence written in a first language;

generating, by a neural network and at a processor, a feature vector of the source sentence by inputting the source sentence to input layers of the neural network;

converting, at the processor and using the neural network, the feature vector of the source sentence to a feature vector of a target sentence, wherein the target sentence is written in a second language; and generating, at the processor and using the neural network, a normalized sentence from the feature vector of the target sentence by transforming the target sentence, by omitting any one or any combination of any two or more of a vocabulary, a morpheme, or a symbol from the source sentence without replacing the vocabulary, the morpheme, or the symbol.

8. The machine translation method of claim 7, wherein the generating of the normalized sentence comprises:

selecting a closest feature vector to the feature vector of the target sentence from feature vectors of pre-determined normalized sentences; and generating the normalized sentence from the selected closest feature vector.

9. The machine translation method of claim 7, wherein the normalized sentence is a sentence generated by substituting a vocabulary and a morpheme in the target sentence, or changing word spacing and a word order in the target sentence.

10. A non-transitory computer-readable storage medium storing instructions that, when executed by a processor, cause the processor to perform the method of claim 1.

11. A machine translation apparatus, comprising:

an interface device configured to receive a source sentence written in a first language;

a memory comprising a neural network;

a processor configured to:

based on a communication with the memory via a bus, generate, by the neural network, a feature vector of the source sentence by inputting the source sentence to input layers of the neural network;

convert, using the neural network, the generated feature vector of the source sentence to a feature vector of a normalized sentence;

generate, using the neural network, a target sentence from the feature vector of the normalized sentence, the normalized sentence being generated from omitting any one or any combination of any two or more of a vocabulary, a morpheme, or a symbol from the source sentence without replacing the vocabulary, the morpheme, or the symbol, wherein the target sentence corresponding to the source sentence is written in a second language; and provide a result of the generating of the target sentence from output layers of the neural network.

12. The machine translation apparatus of claim 11, wherein the feature vector of the normalized sentence is a closest feature vector to the generated feature vector of the source sentence among feature vectors of pre-determined normalized sentences.

13. The machine translation apparatus of claim 11, wherein the normalized sentence is a sentence generated by a substitution of any one or any combination of any two or more of a morpheme, a vocabulary, a word, or a phrase included in the source sentence.

14. The machine translation apparatus of claim 11, wherein the normalized sentence is a sentence generated by changing word spacing in the source sentence.

15. The machine translation apparatus of claim 11, wherein the normalized sentence is a sentence generated by changing a word order in the source sentence.

16. The machine translation apparatus of claim 11, wherein the source sentence is a sentence generated by recognizing a voice signal in the first language received from a user.

17. The machine translation apparatus of claim 11, wherein the neural network comprises an encoder and a decoder, the decoder comprises a normalization layer that converts the target sentence to a normalized sentence and an attention layer that allows vocabularies in the target sentence to be mapped by a one-to-many relationship or a many-to-one relationship.

18. The machine translation method of claim 1, wherein the normalized sentence is a sentence generated by changing a word order to a first order, a second order subsequent to the first order, and a third order subsequent to the second order, wherein the first order comprises a subject as a first word, the second order comprises an object as a first word, and the third order comprises an adverb as a first word.

19. The machine translation method of claim 1, wherein the normalized sentence is generated based on taxonomy mnemonics, morphological structure, and Bayesian probability theory.

20. The machine translation method of claim 1, wherein the normalized sentence is generated based on postpositions.

* * * * *